United States Patent
Bandhauer et al.

(10) Patent No.: US 9,490,507 B2
(45) Date of Patent: Nov. 8, 2016

(54) LI-ION BATTERY THERMAL RUNAWAY SUPPRESSION SYSTEM USING MICROCHANNEL COOLERS AND REFRIGERANT INJECTIONS

(71) Applicant: Lawrence Livermore National Security, LLC, Livermore, CA (US)

(72) Inventors: Todd M. Bandhauer, Livermore, CA (US); Joseph C. Farmer, Tracy, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 659 days.

(21) Appl. No.: 13/900,417

(22) Filed: May 22, 2013

(65) Prior Publication Data
US 2013/0312947 A1 Nov. 28, 2013

Related U.S. Application Data

(60) Provisional application No. 61/650,359, filed on May 22, 2012, provisional application No. 61/650,649, filed on May 23, 2012.

(51) Int. Cl.
*H01M 10/52* (2006.01)
*H01M 10/63* (2014.01)
(Continued)

(52) U.S. Cl.
CPC ............ *H01M 10/502* (2013.01); *G08C 17/02* (2013.01); *H01M 10/613* (2015.04);
(Continued)

(58) Field of Classification Search
CPC ............ H01M 10/613; H01M 10/60; H01M 10/502; H01M 10/5061; H01M 10/6556; H01M 10/6551; H01M 10/6568; H01M 10/052; H01M 10/486; H01M 2200/00; G08C 17/02

USPC ............ 165/287; 429/120, 159, 62
See application file for complete search history.

(56) References Cited

U.S. PATENT DOCUMENTS 5,702,840 A * 12/1997 Byon ............... H01M 2/1241
429/53
5,741,606 A * 4/1998 Mayer ............... H01M 2/1229
429/53

(Continued)

FOREIGN PATENT DOCUMENTS

WO 2009011749 1/2009
WO 2010025761 3/2010

OTHER PUBLICATIONS

International Search Report and Written Opinion for PCT/US14/039193 corresponding to U.S. Appl. No. 13/900,417, 11 pages.

*Primary Examiner* — Tho V Duong
*Assistant Examiner* — Raheena Rehman
(74) *Attorney, Agent, or Firm* — Eddie E. Scott

(57) ABSTRACT

A battery management system with thermally integrated fire suppression includes a multiplicity of individual battery cells in a housing; a multiplicity of cooling passages in the housing within or between the multiplicity of individual battery cells; a multiplicity of sensors operably connected to the individual battery cells, the sensors adapted to detect a thermal runaway event related to one or more of the multiplicity of individual battery cells; and a management system adapted to inject coolant into at least one of the multiplicity of cooling passages upon the detection of the thermal runaway event by the any one of the multiplicity of sensors, so that the thermal runaway event is rapidly quenched.

1 Claim, 8 Drawing Sheets

(51) Int. Cl.
*G08C 17/02* (2006.01)
*H01M 10/6556* (2014.01)
*H01M 10/6568* (2014.01)
*H01M 10/6551* (2014.01)
*H01M 10/613* (2014.01)
*H01M 10/052* (2010.01)
*H01M 10/48* (2006.01)

(52) U.S. Cl.
CPC ... *H01M 10/6551* (2015.04); *H01M 10/6556* (2015.04); *H01M 10/6568* (2015.04); *H01M 10/052* (2013.01); *H01M 10/486* (2013.01); *H01M 2200/00* (2013.01)

(56) References Cited

U.S. PATENT DOCUMENTS

| | | | | |
|---|---|---|---|---|
| 6,447,941 | B1* | 9/2002 | Tomimatsu | H01M 8/04082 |
| | | | | 429/120 |
| 7,794,871 | B2* | 9/2010 | Kim | H01M 2/021 |
| | | | | 429/120 |
| 8,835,038 | B2* | 9/2014 | Abels | H01M 2/1077 |
| | | | | 429/120 |
| 2001/0007728 | A1* | 7/2001 | Ogata | H01M 2/0245 |
| | | | | 429/120 |
| 2001/0026886 | A1* | 10/2001 | Inui | H01M 2/1061 |
| | | | | 429/120 |
| 2002/0028375 | A1* | 3/2002 | Morishita | H01M 2/1077 |
| | | | | 429/120 |
| 2006/0063067 | A1* | 3/2006 | Kim | H01M 2/021 |
| | | | | 429/148 |
| 2006/0093901 | A1* | 5/2006 | Lee | H01M 2/1072 |
| | | | | 429/120 |
| 2006/0216579 | A1* | 9/2006 | Cho | H01M 2/1077 |
| | | | | 429/62 |
| 2007/0026305 | A1* | 2/2007 | Jeon | H01M 2/24 |
| | | | | 429/159 |
| 2007/0072061 | A1* | 3/2007 | Shimizu | H01M 2/1077 |
| | | | | 429/62 |
| 2007/0273507 | A1* | 11/2007 | Burchell | G01K 1/024 |
| | | | | 340/539.27 |
| 2008/0280192 | A1* | 11/2008 | Drozdz | B60K 6/28 |
| | | | | 429/62 |
| 2009/0008074 | A1* | 1/2009 | Vamvakitis | F28D 7/0083 |
| | | | | 165/177 |
| 2011/0076542 | A1* | 3/2011 | Farmer | B82Y 30/00 |
| | | | | 429/120 |
| 2011/0111269 | A1* | 5/2011 | Tse | B60L 3/0007 |
| | | | | 429/50 |
| 2011/0206968 | A1* | 8/2011 | Nishimura | H01M 10/647 |
| | | | | 429/120 |
| 2011/0293986 | A1 | 12/2011 | Kozu | |
| 2012/0258347 | A1* | 10/2012 | Yokoyama | H01M 10/4207 |
| | | | | 429/120 |
| 2013/0004820 | A1 | 1/2013 | Tennessen et al. | |
| 2013/0116868 | A1* | 5/2013 | Erko | B60W 10/26 |
| | | | | 701/22 |
| 2013/0196196 | A1* | 8/2013 | Obeidi | H01M 10/443 |
| | | | | 429/82 |

\* cited by examiner

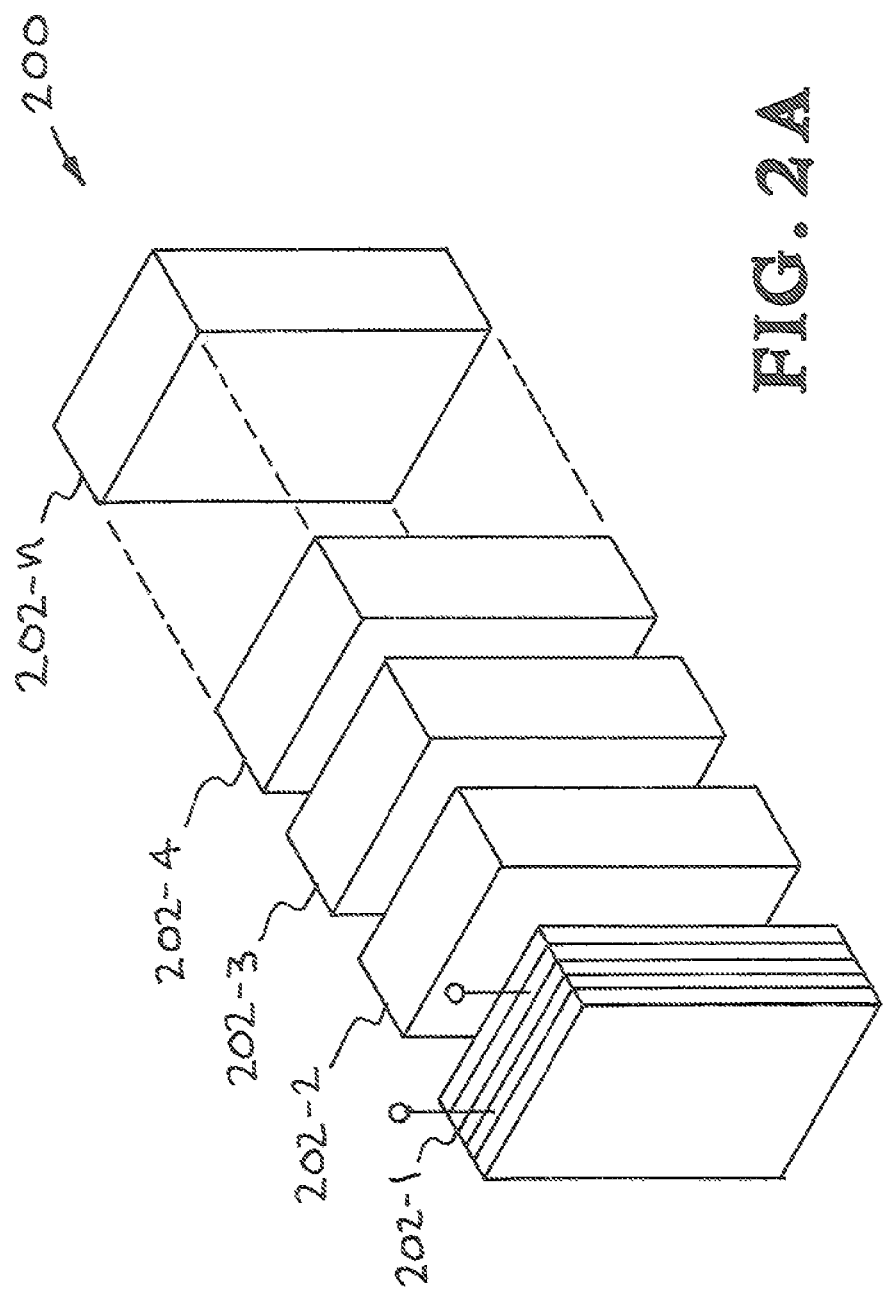

RFID SENSOR MODULE

T=TEMPERATURE

V=TERMINAL VOLTAGE

I=CURRENT $\varepsilon, \epsilon$ =STRESS/STRAIN

AE=ACOUSTIC ENERGY

OE=OPTICAL ENERGY

INTERNAL RESISTANCE

GAS/CHEMICAL EMISSION

FIG. 2C

BATTERY MANAGEMENT SYSTEM

T=TEMPERATURE

V=TERMINAL VOLTAGE

I=CURRENT $\varepsilon, \epsilon$ =STRESS/STRAIN

AE=ACOUSTIC ENERGY

OE=OPTICAL ENERGY

INTERNAL RESISTANCE

GAS/CHEMICAL EMISSION

FIG. 2D

LI-ION BATTERY THERMAL RUNAWAY SUPPRESSION SYSTEM USING MICROCHANNEL COOLERS AND REFRIGERANT INJECTIONS

CROSS-REFERENCE TO RELATED APPLICATIONS

This application claims benefit under 35 U.S.C. §119(e) of U.S. Provisional Patent Application No. 61/650,359 filed May 22, 2012 entitled "Thermally Integrated Fire Suppression System for Lithium-Ion Battery Packs" and U.S. Provisional Patent Application No. 61/650,649 filed May 23, 2012 entitled "Lithium Ion Battery Management System with Distributed Wireless & Fiber Optic Sensors, and Embedded Fire Suppression System. The disclosure of U.S. Provisional Patent Application No. 61/650,359 and No. 61/650,649 are hereby incorporated herein by reference in its entirety for all purposes.

STATEMENT AS TO RIGHTS TO INVENTIONS MADE UNDER FEDERALLY SPONSORED RESEARCH AND DEVELOPMENT

The United States Government has rights in this invention pursuant to Contract No. DE-AC52-07NA27344 between the United States Department of Energy and Lawrence Livermore National Security, LLC for the operation of Lawrence Livermore National Laboratory.

BACKGROUND

1. Field of Endeavor

The present invention relates to batteries and more particularly to a battery management systems with thermally integrated fire suppression 2. State of Technology The most critical issue facing widespread adoption of rechargeable lithium ion batteries in large scale, vehicular applications is safety. Once these batteries reach internal temperatures of approximately 90° C., self-sustaining exothermic reactions trigger dangerous thermal runaway. The cause of these events can be internal or external short from a variety of causes, included crushing, containment penetration, external heating events, or manufacturing defects. In addition, these batteries are also significantly overdesigned to compensate capacity loss through cycling at moderately high temperatures, with significant capacity loss occurring above ~50° C. for virtually every commercially applicable cell chemistry. Furthermore, these batteries contain a low thermal conductivity plastic (e.g., polyethylene or polypropylene) separator soaked in a non-aqueous electrolytic solution. As a result, when multiple cells are stacked together, it is difficult to remove heat from the more thermally insulated portions of the battery. This makes mitigation of thermal runaway even more difficult, and can cause localized cycling of the battery, which can lead to premature aging.

International Patent Application Publication No. WO 2010/025761 for a system for fire protection provides the state of technology information quoted below. International Patent Application Publication No. WO 2010/025761 is incorporated herein by this reference.

"Power transmission networks sometimes utilize backup power systems, for example in order to compensate for varying power generation or load, or in the case of loss of power. This can for example be the case in wind- or solar power systems. The backup power system provides power during fluctuations of the generated wind or solar power and even during power outages."

"Such backup power systems rely on a bank of batteries to store enough energy to even out the power fluctuations. In power transmission networks such battery storage systems may consist of a large amount of battery cells connected in series and parallel to reach sufficiently high voltage levels and high power and energy. The voltage levels may be in the order of several tens of kV and power capability up to several 10 MWs or even in the order of 100 MW. To achieve this, such battery energy storage systems will comprise several thousand battery cells."

"The batteries of the backup power thus contain high amount of energy, and a failing battery cell, e.g. by external or internal short circuit or overload, will quickly become very hot. The heat emitted from the failing cell will heat up an adjacent battery cell, which in turn will heat up the next cell and so on, and this of course constitutes a huge fire hazard. As an example. Li-ion battery cells exceeding a critical temperature may result in opening of the cell, known as venting of the cell, with a release of highly inflammable gases that can easily catch fire. If this happens there is a large risk of the whole battery storage system being destroyed."

"The gases released from Li-ion battery cells may contain a mixture of hydrogen, carbon monoxide, carbon dioxide, methane, ethane, methylene, propylene, organic carbonates and also carbon powder. The battery backup systems are therefore usually protected by temperature sensors detecting heat of a fire and by fire extinguishing means, for example argonite based fire extinguishers. Argonite gas is injected rapidly into the storage room within which the battery backup is stored, when the temperature sensors detect an abnormal temperature."

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides a battery management system with thermally integrated fire suppression. The battery management system with thermally integrated fire suppression includes a multiplicity of individual battery cells in the housing; a multiplicity of cooling passages in the housing within or between the multiplicity of individual battery cells; a multiplicity of sensors operably connected to the individual battery cells, the sensors adapted to detect a thermal runaway event related to one or more of the multiplicity of individual battery cells; and a management system adapted to inject coolant into at least one of the multiplicity of cooling passages upon the detection of the thermal runaway event by the any one of the multiplicity of sensors, so that the thermal runaway event is rapidly quenched.

The present invention provides method of thermally managing a battery pack from thermal runaway events. The battery pack has a multiplicity of individual battery cells.

The method includes the steps of providing a plurality of cooling passages between the multiplicity of individual battery cells, providing a source of coolant operatively connected to one or more of the multiplicity of cooling passages, providing a sensor operably connected to each of the multiplicity of battery cells, the sensor adapted to detect a thermal runaway event related to one or more of the individual battery cells, and injecting the coolant from the source of coolant into at least one of the multiplicity of cooling passages upon the detection of the thermal runaway event by the sensor, so that the thermal runaway event is rapidly quenched.

The present invention has use with any large lithium-ion battery pack where there are multiple cells. This use includes hybrid electric and plug-in electric automotive vehicles, manned and autonomous aerial, terrestrial, and ocean-going vehicles for defense, oil and gas, shipping, and passenger transport applications, and large-scale grid energy storage applications.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

FIGS. 2A-2D illustrate the components of a battery management system of the present invention.

DETAILED DESCRIPTION OF SPECIFIC EMBODIMENTS

Figure 1:
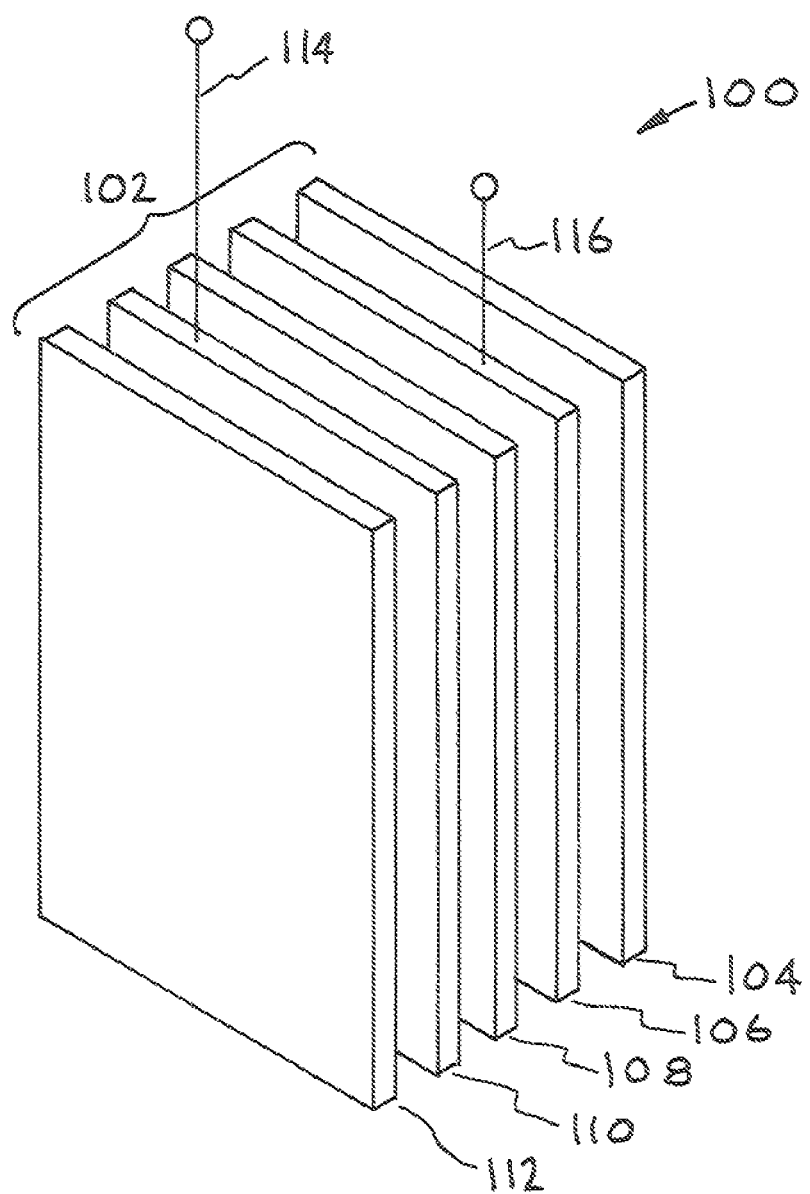
FIG. 1 is an exploded view of the interior of a lithium ion battery cell.

Referring to the drawings, to the following detailed description, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

Lithium-ion batteries fail violently, especially when connected in large series parallel arrangements for battery packs. Many recent commercial and military events have shown the destructive power of these cells during thermal events. The key to mitigating thermal runaway is to stop the failing cell early by removing heat generated by the cell during one of these events, which include internal shorting, external shorting, overcharging, or some form of destroying the cell via force. Currently, the only means for containing an event is to douse the battery with hand held fire extinguisher.

Referring now to the drawings, a battery management system with a thermally integrated fire suppression system of the present invention is illustrated. An exploded view of the interior of a lithium ion battery cell 102 is illustrated in FIG. 1. The battery management system with a thermally integrated fire suppression system is designated generally by the reference numeral 100. The system 100 illustrated in FIG. 1 shows a cell 102. The cell 102 includes a separator 104, a cathode 106, a separator 108, an anode 110, and a separator 112. Terminal 116 is connected to the cathode 106. Terminal 114 is connected to the anode 110.

Figure 2B:
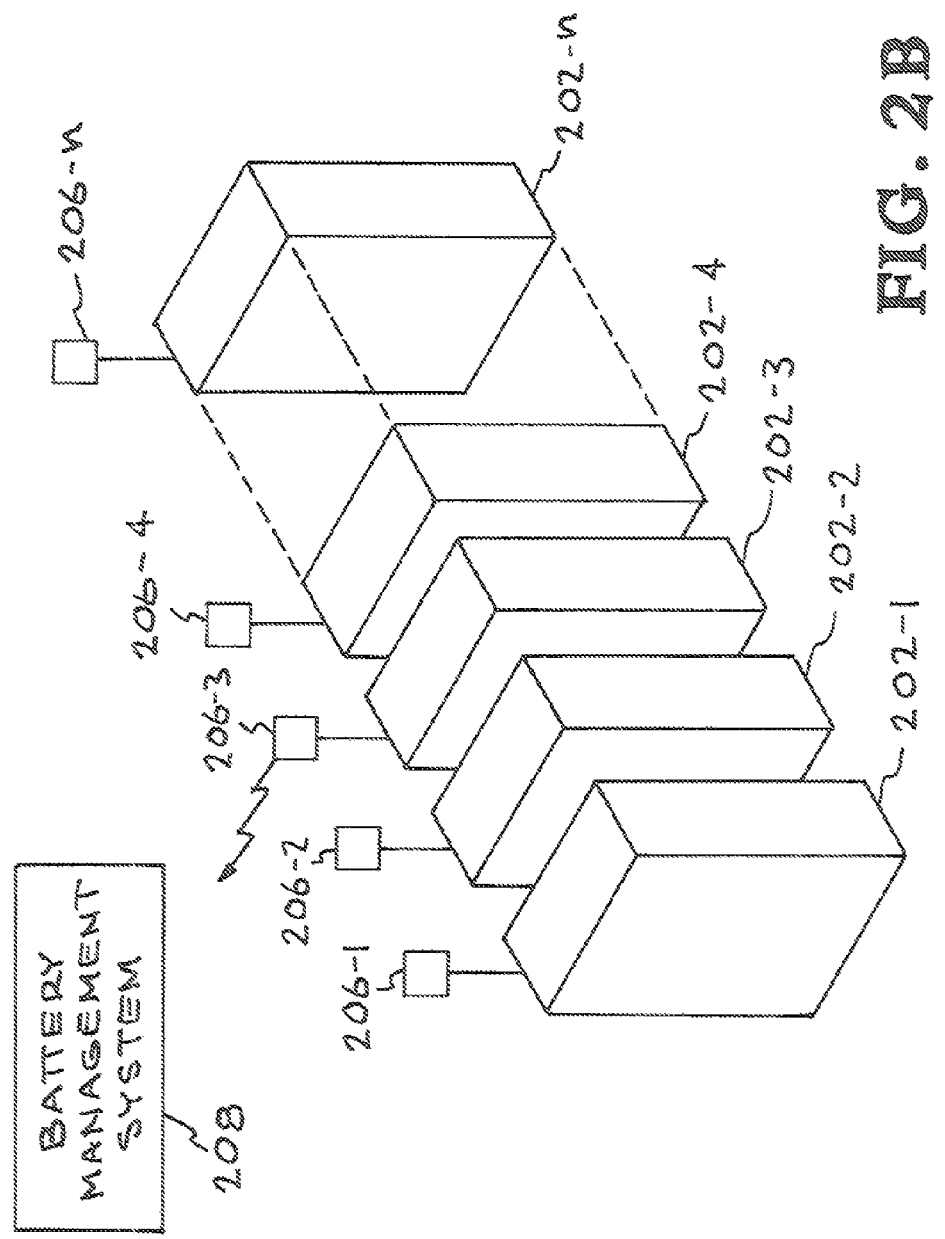

Referring now to FIGS. 2A, 2B, 2C, and 2D, the components of the battery management system are illustrated. FIG. 2A shows an exploded view of an array of battery cells that are the battery cells that were illustrated in FIG. 1. FIG. 2A shows an array of battery cells including battery cell 202-1, battery cell 202-2, battery cell 202-3, battery cell 202-4, and battery cells through 202-n. In one embodiment, the system 100 includes any number of lithium ion battery modules or lithium ion battery packs within a housing. Each individual lithium ion battery module or pack includes any number of individual lithium ion battery cells 202-1 through 202-n. The lithium ion battery module or pack may for example comprise a number of series-connected and/or parallel-connected lithium ion battery cells housed within the lithium ion battery pack housing.

FIG. 2B shows sensors connected to each of the individual energy storage cells for identification and detection of the parameters of each individual energy storage cell. As shown in FIG. 2B the array of battery cells includes battery cell 202-1, battery cell 202-2, battery cell 202-3, battery cell 202-4, and battery cells through 202-n. A sensor 206-1 is operably connected to the battery cell 202-1. A sensor 206-2 is operably connected to the battery cell 202-2. A sensor 206-3 is operably connected to the battery cell 202-3. A sensor 206-4 is operably connected to the battery cell 202-4. Sensors 206-n are operably connected to the battery cells through 202-n. In one embodiment, the system 100 includes Radio Frequency identification (RFID) sensors 206-1 through 206-n.

A battery management system 208 monitors the information provided by the sensors 206-1 through 206-n. The sensors 206-1 through 206-n provide information regarding parameters of each individual energy storage cell 206-1 through 202-n. The parameters include one or more of the following parameters: cell voltage, cell current, cell impedance, cell temperature, cell internal pressure, stress and strain in the cell, electrolyte leakage, gas evolution and leakage, optical and nuclear particle transmission and scattering, and/or pyrotechnic displays. As will be explained subsequently, a thermally integrated fire suppression system injects refrigerant into cooling passages operably connected to the energy storage cells upon the detection of a thermal runaway event by the sensors so that said thermal runaway event is rapidly quenched. In one embodiment, the system 100 includes a remote lithium ion battery management system 208 that is operatively connected to the lithium ion battery module or pack, the lithium ion battery cells 202-1 through 202-*n*, and the Radio Frequency Identification (RFID) sensors 206-1 through 206-*n*.

FIG. 2C is a chart that illustrates that the sensors 206-1 through 206-*n* provide information regarding parameters of each individual energy storage cell 206-1 through 202-*n*. The parameters include one or more of the following parameters: cell voltage, cell current, cell impedance, cell temperature, cell internal pressure, stress and strain in the cell, electrolyte leakage, gas evolution and leakage, optical and nuclear particle transmission and scattering, and/or pyrotechnic displays.

FIG. 2D is a chart that illustrates that the battery management system 208 information regarding parameters of each individual energy storage cell 206-1 through 202-*n*. The parameters include one or more of the following parameters: cell voltage, cell current, cell impedance, cell temperature, cell internal pressure, stress and strain in the cell, electrolyte leakage, gas evolution and leakage, optical and nuclear particle transmission and scattering, and/or pyrotechnic displays.

Figure 3:
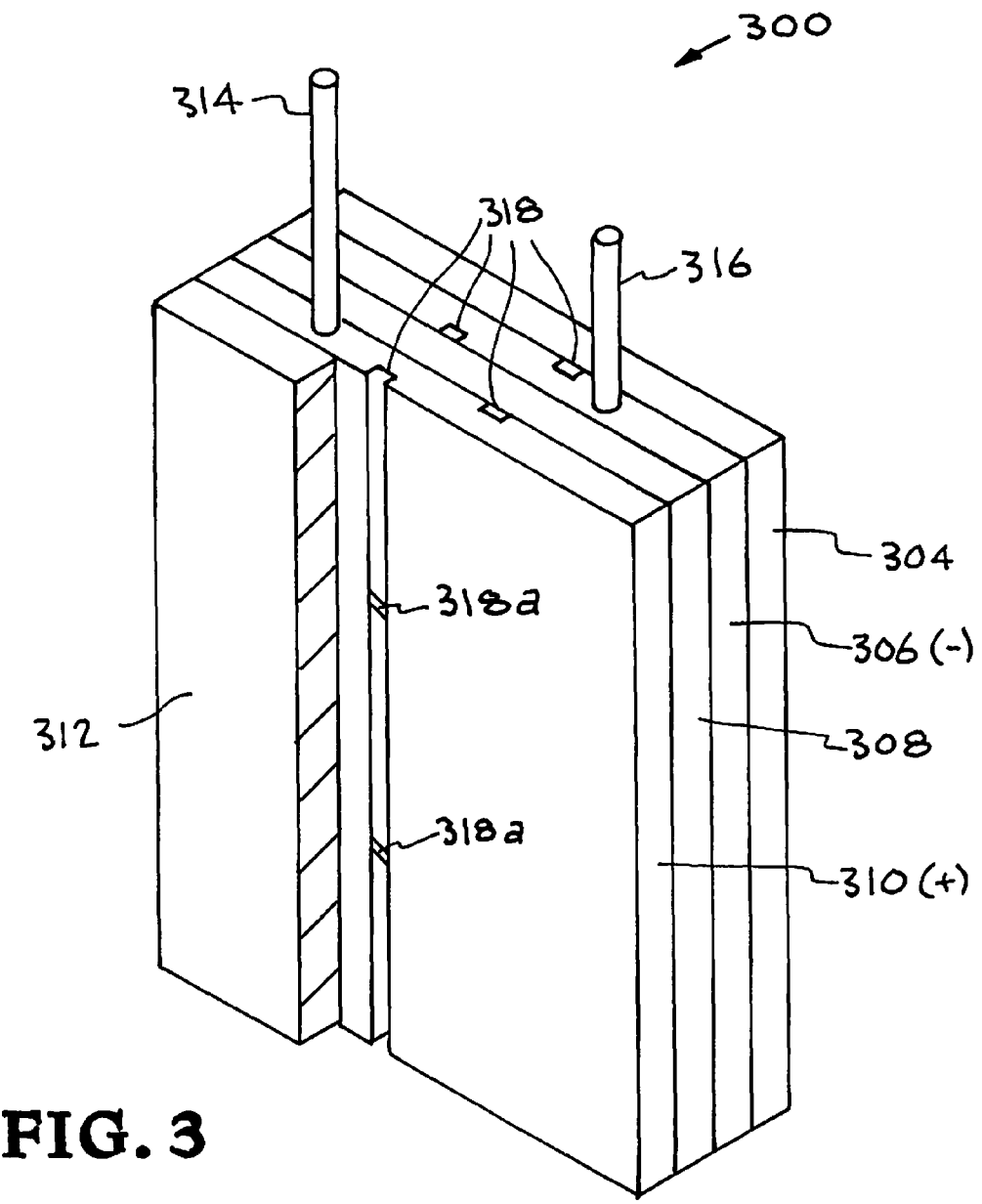
FIG. 3 illustrates additional details of the battery management system of the present invention.

Referring now to FIG. 3, additional details of the battery management system of the present invention are illustrated. The battery management system is designated generally by the reference numeral 300. The battery management system 300 includes a separator 304, a cathode 306, a separator 308, an anode 310, a separator 312, and microchannels 318 that include cooling fins 318*a*, wherein the microchannels 318 that include cooling fins 318*a* provide an internal cooling structure integrated into the cell. Terminal 316 is connected to the cathode 306. Terminal 314 is connected to the anode 310.

The battery management system 300 enables detection of thermal runaway at very early stages and can quench the cell with high pressure refrigerant injected directly into the cell. The cell includes the internal passages 318 inside the cell that enables rapid quenching through direct contact heat transfer with the core of the battery. The battery management system 300 will mitigate thermal runaway at the individual cell level completely eliminating any potential for cell-to-cell propagation.

Figure 4:
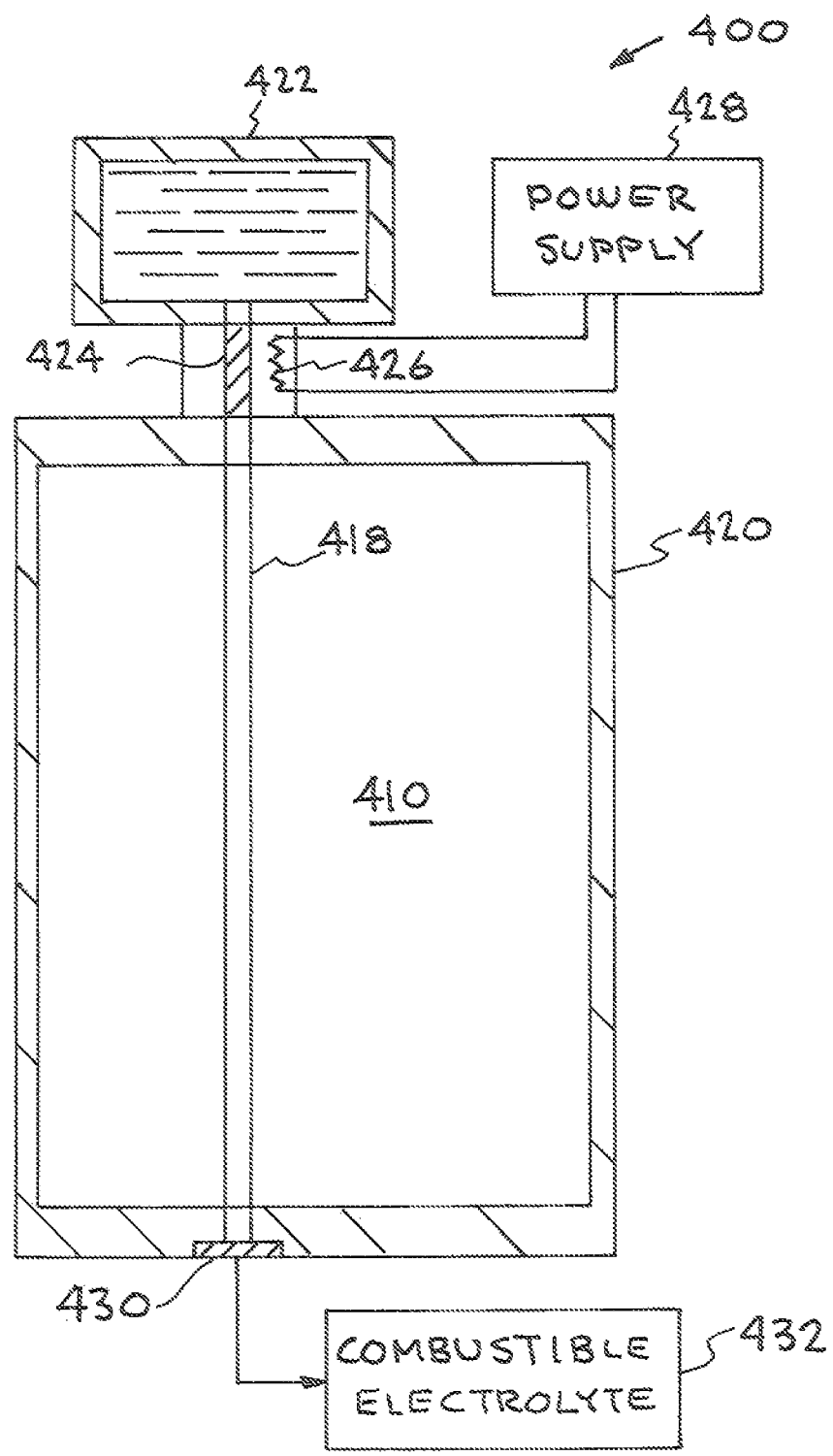
FIG. 4 illustrates additional details of the battery management system of the present invention.

Referring now to FIG. 4, additional details of the battery management system of the present invention are illustrated. This illustration of the battery management system is designated generally by the reference numeral 400. The battery management system 400 includes a cell housing 420. The cell housing 420 contains a first separator, a cathode, a second separator, an anode, a third separator, and microchannels as describe in connection with FIG. 3. A terminal is connected to the cathode and a terminal is connected to the anode. One of the microchannels, microchannel 418, is illustrated in FIG. 4. A coolant reservoir 422 containing coolant 410 is connected to the microchannel 418. A fuseable plug 424, heater 426, and power supply 428 provide a system for directing coolant 410 from the coolant reservoir 422 into the microchannel 418. A burst disk 430 temporarily closes the microchannel 418. Once the internal pressure reaches a threshold, the burst disk 430 will passively open, and the normally combustible electrolyte 432 will be effectively diluted when it is vented.

The battery management system 400 enables detection of thermal runaway at very early stages and can quench the cell with high pressure refrigerant injected directly into the cell. The cell includes the internal passages 418 inside the cell that enables rapid quenching through direct contact heat transfer with the core of the battery. The battery management system 400 will mitigate thermal runaway at the individual cell level, completely eliminating any potential for cell-to-cell propagation.

Figure 5:
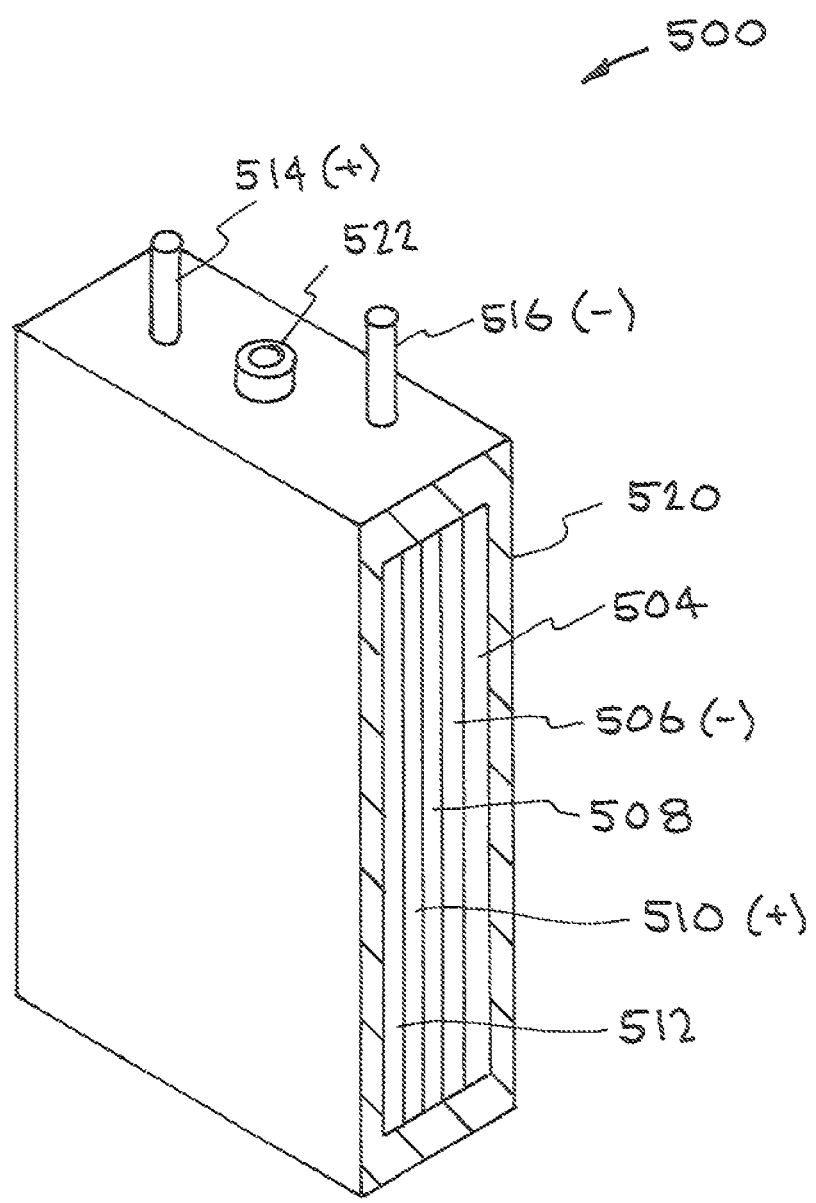
FIG. 5 illustrates additional details of the battery management system of the present invention.

Referring now to FIG. 5, additional details of the battery management system of the present invention are illustrated. This illustration of the battery management system is designated generally by the reference numeral 500. The battery management system 500 includes a cell housing 520. The cell housing 520 contains a first separator 504, a cathode 506, a second separator 508, an anode 510, a third separator 512, and microchannels as describe in connection with FIG. 4. A terminal 514 is connected to the cathode 506 and a terminal 516 is connected to the anode 510. Microchannels as previously described allow fluid to be circulated through the cell housing 520. A coolant reservoir is connected to the coolant port 522. The battery management system 500 enables detection of thermal runaway at very early stages and can quench the cell with high pressure refrigerant injected directly into the cell. The cell includes the internal passages 518 inside the cell that enables rapid quenching through direct contact heat transfer with the core of the battery. The battery management system 500 will mitigate thermal runaway at the individual cell level, completely eliminating any potential for cell-to-cell propagation.

Figure 6:
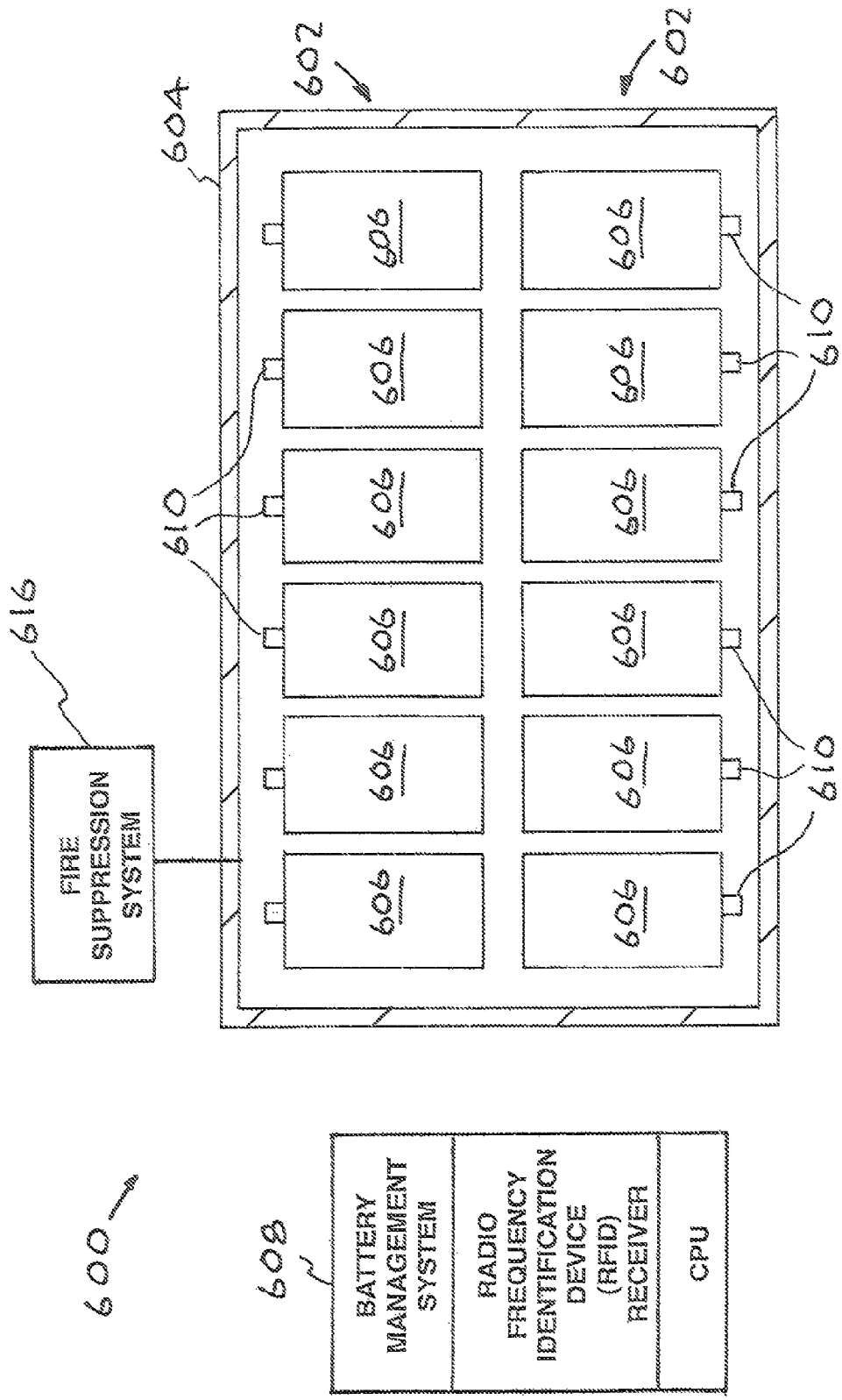
FIG. 6 illustrates another embodiment of the invention having a multiplicity of individual battery cells and a corresponding number of sensors such as Radio Frequency Identification (RFID) sensors in communication with a battery management system.

Referring now to FIG. 6, another embodiment of the invention having a multiplicity of individual battery cells and a corresponding number of sensors such as Radio Frequency Identification (RFID) sensors in communication with a battery management system is illustrated. This embodiment is designated generally by the reference numeral 600. The system 600 includes any number of lithium ion battery modules or lithium ion battery packs 602 within a housing 604. Each individual lithium ion battery module or pack 602 includes any number of individual lithium ion battery cells 606. The lithium ion battery module or pack 602 may for example comprise a number of series-connected and/or parallel-connected lithium ion battery cells 602 housed within the lithium ion battery pack housing 604. Channels or microchannels are provided for directing a coolant fluid such as sea water into the battery pack housing 604.

Each individual lithium ion battery module or pack 602 includes any number of individual lithium ion battery cells 606 and a corresponding number of Radio Frequency Identification (RFID) sensors 610. A remote lithium ion battery management system 608 is operatively connected to the lithium ion battery module or pack 602, the lithium ion battery cells 606, and the Radio Frequency Identification (RFID) sensors 610 in the housing 604.

The system 700 provides an advanced lithium ion battery management system for the lithium ion battery module or pack 602 and the lithium ion battery cells 606 using the Radio Frequency Identification (RFID) sensors 610. The system 600 includes a fire suppression system 616 operatively connected to the housing 604 and the lithium ion battery management system 608. The system 600 enables detection of various events in the lithium ion battery module or pack 602 and the lithium ion battery cells 606. The remote lithium ion battery management system 608 enables remedial action using the fire suppression system 616.

Referring again to FIG. 6, a system is illustrated that in one embodiment can consist of large series-parallel arrays of high performance lithium ion battery cells. The system 600 enables the early detection of various events in the high capacity lithium ion battery packs to provide rapid response to prevent and suppress such events before the results become catastrophic. The distributed wireless sensors 610 enable the detection of various parameter including one or more of the following parameters: cell voltage, cell current, cell impedance, cell temperature, cell internal pressure, stress and strain in the cell package, electrolyte leakage, gas evolution and leakage, optical and nuclear particle transmission and scattering, and any pyrotechnic displays internal to the lithium ion battery pack that may be attributed to the onset of thermal runaway. The sensors 610 may be either active or passive, with communication possible via the RFID components. Once the sensors 610 detect the onset of an event, the signal is used to appropriately manage pack operation (charge and discharge), and remedial action systems will be activated. The remote lithium ion battery management system 608 enables remedial action using the fire suppression system.

Although the description above contains many details and specifics, these should not be construed as limiting the scope of the invention but as merely providing illustrations of some of the presently preferred embodiments of this invention. Other implementations, enhancements and variations can be made based on what is described and illustrated in this patent document. The features of the embodiments described herein may be combined in all possible combinations of methods, apparatus, modules, systems, and computer program products. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Therefore, it will be appreciated that the scope of the present invention fully encompasses other embodiments which may become obvious to those skilled in the art. In the claims, reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present invention, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A battery management system with thermally integrated fire suppression, comprising:
    a housing,
    a number one individual battery cell in said housing;
    a number two individual battery cell in said housing;
    additional individual battery cells numbers three through "n" in said housing, wherein "n" is the total number of individual battery cells in said housing;
    a number one cooling passage in said housing between said number one individual battery cell and said number two individual battery cell;
    a number two cooling passage in said housing between said number two individual battery cell and said number three individual battery cell;
    additional cooling passages three through "n" in said housing, wherein "n" is the total number of cooling passages in said housing, said additional cooling passages three through "n" located between said additional individual battery cells;
    wherein said number one cooling passage and said number two cooling passage and said additional cooling passages three through "n" comprise microchannels;
    a number one radio frequency identification sensor connected directly to said number one individual battery cell, said number one radio frequency identification sensor adapted to detect a thermal runaway event related to said number one individual battery cell;
    a number two radio frequency identification sensor connected directly to said number two individual battery cell, said number two radio frequency identification sensor adapted to detect a thermal runaway event related to said number two individual battery cell;
    additional radio frequency identification sensors numbers three through "n" wherein "n" is the total number of radio frequency identification sensors, connected directly to said respective number three individual battery cell through "n" battery cell, adapted to detect a thermal runaway event related to said number three individual battery cell through "n" battery cell;
    a coolant;
    a coolant reservoir containing said coolant,
    a fuseable plug,
    a heater,
    a power supply for directing said coolant from said coolant reservoir into said number one cooling passage or said number two cooling passage or said additional cooling passages three through "n"; and
    a management system adapted to inject said coolant into at least one of said number one cooling passage or said number two cooling passage or said additional cooling passages three through "n" upon the detection of said thermal runaway event by any one of said number one radio frequency identification sensor or said number two radio frequency identification sensor or said additional radio frequency identification sensors numbers three through "n", wherein said coolant from said coolant reservoir produces coolant pressure;
    further comprising a burst disk in said housing, wherein said burst disk will open when said coolant reservoir produces said coolant pressure so that said thermal runaway event is rapidly quenched.

* * * * *